(12) United States Patent  
Corniot

(10) Patent No.: US 7,658,099 B2  
(45) Date of Patent: Feb. 9, 2010

(54) METHOD FOR DETERMINING THE LOAD CONDITION OF A VEHICLE

(75) Inventor: Philippe Corniot, Enval (FR)

(73) Assignees: Michelin Recherche et Technique S.A., Granges-Paccot (CH); TRW Automotive U.S., LLC., Livonia, MI (US)

( * ) Notice: Subject to any disclaimer, the term of this patent is extended or adjusted under 35 U.S.C. 154(b) by 523 days.

(21) Appl. No.: 11/710,320

(22) Filed: Feb. 23, 2007

(65) Prior Publication Data

US 2007/0204685 A1    Sep. 6, 2007

Related U.S. Application Data

(60) Provisional application No. 60/787,802, filed on Mar. 31, 2006.

(30) Foreign Application Priority Data

Mar. 1, 2006    (FR) .................................. 06 01828

(51) Int. Cl.  
*B60C 23/02* (2006.01)
(52) U.S. Cl. .................................................. 73/146.5
(58) Field of Classification Search ......... 73/146–146.8  
See application file for complete search history.

(56) References Cited

U.S. PATENT DOCUMENTS

| 2004/0017289 A1* | 1/2004 | Brown, Jr. ................... 340/442 |
| 2005/0030170 A1* | 2/2005 | Rieck et al. ................. 340/443 |

FOREIGN PATENT DOCUMENTS

| DE | 10 2004 026 833 A1 | 12/2005 |
| EP | 0 564 285 A1 | 10/1993 |
| WO | WO 00/69662 A | 11/2000 |
| WO | WO 03/016115 A | 2/2003 |
| WO | WO 2005/097525 A | 10/2005 |

\* cited by examiner

*Primary Examiner*—Andre J Allen  
(74) *Attorney, Agent, or Firm*—Cohen Pontani Lieberman & Pavane LLP

(57) ABSTRACT

Method for determining the load condition of a vehicle (60) moving at non-zero speed, the vehicle being equipped with a plurality of tire-wheel assemblies (41-42, 51-52) mounted on at least two axles and with devices that enable determination of the vehicle's speed and the rotation frequencies or speeds and actual inflation pressures of at least two tire-wheel assemblies mounted on two different axles of the vehicle, the method comprising the following stages: (A) determination of the inflation pressures and rotation frequencies of two tire-wheel assemblies mounted on two different axles; (B) calculation of the load difference between the two tire-wheel assemblies from the vehicle's speed and the rotation frequencies of the two tire-wheel assemblies, taking into account the actual inflation pressures; (C) determination of the load condition by comparing the calculated load difference with at least one predetermined threshold.

21 Claims, 3 Drawing Sheets

(a)　　　(b)　　　(c)　　　(d)

METHOD FOR DETERMINING THE LOAD CONDITION OF A VEHICLE

RELATED APPLICATIONS

This application claims priority from U.S. Provisional Patent Application Ser. No. 60/787,802 filed Mar. 31, 2006 and French Patent Application no. 06/01818 filed Mar. 1, 2006. The contents of both of which are hereby incorporated by reference.

BACKGROUND OF THE INVENTION

1. Field of the Invention

The present invention concerns methods for determining the load condition of a vehicle and methods for monitoring the inflation pressure of tires, which enable the driver to be alerted to the need to adapt the inflation pressure and/or to initiate automatic adaptation of that pressure.

2. Technological Background

For any vehicle fitted with tires, monitoring of the inflation pressure of the tires is essential for ensuring the safety of the vehicle's occupants and that of other road users. For example, if the inflation pressure of a tire is too low, the tire's sidewalls work abnormally and this can result in excessive fatigue of the carcass, elevation of the temperature and abnormal wear: the tire is at risk of irreversible damage, the greatest risk clearly being that the tire may burst during service and that the driver loses control of the vehicle. On the other hand, too high an inflation pressure can result in vehicle stability problems because the contact of the tire with the ground is reduced.

However, it is not possible to specify a single inflation pressure for a given tire fitted on a given vehicle; the pressure depends on the conditions of use and in particular on the load carried by the vehicle: as the load carried by the vehicle increases, the inflation pressure should be increased as well. In effect, the load that can be carried by a tire depends on its internal volume and its inflation pressure. If the pressure/load ratio is correct, the sidewalls of the tire undergo appropriate bending and the service life of the carcass is extended.

The problem arises not just when the tire is being inflated, but also for the continuous monitoring of its inflation pressure. A system aiming to alert a driver to any anomaly of the inflation pressure should in principle take into account the load actually carried by the vehicle: a given inflation pressure can be correct for an unloaded vehicle and insufficient when the vehicle is heavily loaded.

The definition of a predetermined alarm threshold does not overcome that difficulty. If an alarm threshold is set to the minimum inflation pressure that would still be acceptable for a vehicle carrying no load ($P_{min}(z_0)$), cases when the inflation pressure is higher than that threshold but insufficient in relation to the actual load carried by the vehicle would not be detected. Conversely, if the alarm threshold is set at the minimum pressure still acceptable for a tire carrying maximum load ($P_{min}(z_{max})$), the alarm could be emitted even when the pressure/load ratio is far from being actually unacceptable, in particular when the vehicle is carrying little or no load. Such a threshold would also have the disadvantage of being too close to the pressure recommended for an unloaded vehicle: in effect, tire temperature variations etc. make monitoring impossible with an accuracy better than 0.3 bar. If the difference between the alarm threshold and the inflation pressure recommended for a vehicle carrying no load is smaller than 0.3 bar, reliable and pertinent detection of anomalies is impossible.

What has just been said must also be supplemented by considering the position of the tire on the vehicle. Depending on whether a tire is fitted on the front or rear axle of a vehicle, the load it carries can be very different and can vary greatly as a function of the overall load of the vehicle. In a traction-type vehicle with its engine at the front, the load carried by the tires of the front axle is very significantly higher than the load carried by those on the rear axle when the vehicle is empty, i.e. carrying no load; this load difference decreases as the overall load of the vehicle increases. Conversely, in a propulsion-type vehicle with its engine at the front, the load difference between a front axle tire and a rear axle tire is small when the vehicle is empty and increases as the load carried by the vehicle increases.

This is why vehicle manufacturers generally supply inflation tables that enable users to adapt the inflation pressure to the load carried by the vehicle, taking into account the position of the tires on the vehicle. Those tables generally give at least the inflation pressures recommended for the tires of each axle in two load situations: low load and high load. Thus, correct use of such tables presupposes knowledge of the load currently carried by the vehicle. Ignorance of that load introduces an uncertainty factor in the determination of inflation pressure and consequently tends to reduce the vehicle user's safety margin. It would of course be possible to overcome that difficulty by providing the vehicle with load sensors, but the cost of such equipment is such that most vehicles are not equipped.

SUMMARY OF THE INVENTION

The present invention aims to allow a determination of the load carried by a vehicle and of the tire inflation pressure appropriate for that load, without direct measurement of the load carried by the tires, by making use of the signals available in a vehicle equipped with devices that enable the direct or indirect determination of the rotation frequencies or speeds of tire-wheel assemblies (such as an ABS system) and their inflation pressures. In what follows, "inflation pressure of a tire-wheel assembly" is understood to mean the inflation pressure of the tire forming part of the tire-wheel assembly.

The objective is achieved with the aid of a method for determining the load condition of a vehicle moving at non-zero speed, the vehicle being equipped with a plurality of tire-wheel assemblies mounted on at least two axles and with devices enabling determination of the vehicle's speed, the rotation frequencies or speeds and the actual inflation pressures of at least two tire-wheel assemblies mounted on different axles, the method comprising the following stages:

(A) determination of the inflation pressures and rotation frequencies of two tire-wheel assemblies mounted on two different axles;

(B) calculation of the load difference between the two tire-wheel assemblies from the speed of the vehicle and the rotation frequencies of the two tire-wheel assemblies, taking into account the actual inflation pressures;

(C) determination of the load condition by comparing the calculated load difference with at least one predetermined threshold.

The method according to the invention is distinguished from the known methods, such as the method disclosed in the document U.S. Pat. No. 7,013,721 in that the actual (instantaneous) inflation pressure is taken into account. Thus it is possible to detect not only vehicle overloading, but above all inadequate inflation pressure with respect to the actual loading.

The load difference between the two tire-wheel assemblies can be calculated from the vehicle's speed, the inflation pressures and the rotation frequencies of the two tire-wheel assemblies, in particular as follows.

First, a "rolling radius" $R_i(t)$ of the wheel i is determined from the vehicle's speed v and the rotation frequency $f_i$ of the wheel i: the relation:

$$v = \omega_i \cdot R_i = 2 \cdot \pi \cdot f_i \cdot R_i \tag{1}$$

where $\omega_i$ is the angular velocity of the wheel i leads to:

$$R_i(t) = \frac{v(t)}{2 \cdot \pi \cdot f_i(t)} \tag{2}$$

This "rolling radius", of course, is a virtual magnitude and does not necessarily correspond to a radius of the tire flattened by the load.

Granted that it is difficult to define a reference condition for a given wheel, a comparison is made between the wheels. A "relative flattening" of a wheel i relative to a reference wheel "0" is defined:

$$E_{i,0}^{rel}(t) \equiv \frac{R_i(t) - R_0(t)}{R_0(t)} \tag{3}$$

Insertion of (2) into (3) gives:

$$E_{i,0}^{rel}(t) = \frac{\frac{v}{2 \cdot \pi \cdot f_i} - \frac{v}{2 \cdot \pi \cdot f_0}}{\frac{v}{2 \cdot \pi \cdot f_0}} = \frac{\frac{1}{f_i} - \frac{1}{f_0}}{\frac{1}{f_0}} = \frac{f_0}{f_i} - \frac{f_0}{f_0} = \frac{f_0}{f_i} - 1 \tag{4}$$

Thus, measurement of the rotation frequencies $f_o$ and $f_i$ enables the relative flattening to be calculated easily.

It is possible to carry out a limited development of the rolling radius variations as a function of the factors that influence it substantially, namely the inflation pressure $P_i$ of the tire fitted on wheel i and the load $z_i$ it is carrying, as well as the rotation frequency $f_o$ measured for the reference wheel; for the relative flattening the following expression is then obtained:

$$E_{i,0}^{rel}(t) = \frac{R_i(t) - R_0(t)}{R_0(t)} = \frac{\begin{bmatrix} \frac{\partial R_{i,0}}{\partial P} \cdot (P_i(t) - P_0(t)) + \\ \frac{\partial R_{i,0}}{\partial z} \cdot (z_i(t) - z_0(t)) + \frac{\partial R_{i,0}}{\partial f} \cdot f_0(t) + \delta R_{i,0} \end{bmatrix}}{R_0(t)} \tag{5}$$

From this, the following expression can be deduced for the load difference:

$$z_i(t) = z_0(t) = \frac{R_0(t) \cdot E_{i,0}^{rel}(t) - \delta R_{i,0} - \frac{\partial R_{i,0}}{\partial P} \cdot (P_i(t) - P_0(t)) - \frac{\partial R_{i,0}}{\partial f} \cdot f_0(t)}{\frac{\partial R_{i,0}}{\partial z}} \tag{6}$$

In most vehicles the load carried by one of the axles (generally, that which supports the weight of the engine) is almost independent of the load condition of the vehicle. If this is the case, the load condition can be determined from the load difference between a front wheel and a rear wheel, and this also enables a reduction of the number of wheels fitted with sensors. It is particularly advantageous to consider two wheels mounted on the same side of the vehicle (preferably the driver's side), since this allows the influence of bends to be avoided. By determining a threshold for $z_i(t) - z_o(t)$ it is then possible to distinguish the "loaded" condition from the "unloaded" condition. Of course, a more refined distinction can also be envisaged.

Equation (6) can be written as follows:

$$z_i(t) - z_0(t) = a \cdot E_{i,0}(t) + b \cdot (P_i(t) - P_0(t)) + c \cdot f_0(t) + d \tag{7}$$

where $$a \equiv \frac{R_0(t)}{\frac{\partial R_{i,0}}{\partial z}} \quad b \equiv \frac{\frac{\partial R_{i,0}}{\partial P}}{\frac{\partial R_{i,0}}{\partial z}} \quad c \equiv -\frac{\frac{\partial R_{i,0}}{\partial f}}{\frac{\partial R_{i,0}}{\partial z}} \quad d \equiv -\frac{\delta R_{i,0}}{\frac{\partial R_{i,0}}{\partial z}} \tag{8}$$

The coefficients a to d have to be determined once for each type of vehicle and each type of tire. N tests are carried out, in which the vehicle is used under different conditions of loading, speed, inflation pressure etc. Each time, the load difference, the vehicle's speed, the inflation pressures and the rotation frequencies of the tire-wheel assemblies are recorded. The coefficients are then determined by solving a system of first-degree equations:

$$\begin{bmatrix} E_{i,0}^{rel}(t_1) & P_i(t_1) - P_0(t_1) & f_0(t_1) & 1 \\ \vdots & \vdots & \vdots & \vdots \\ E_{i,0}^{rel}(t_N) & P_i(t_N) - P_0(t_N) & f_0(t_N) & 1 \end{bmatrix} \otimes \begin{bmatrix} a \\ b \\ c \\ d \end{bmatrix} = \begin{bmatrix} z_i(t_1) - z_0(t_1) \\ \vdots \\ z_i(t_N) - z_0(t_N) \end{bmatrix} \tag{9}$$

Once the coefficients are known, the load difference can be calculated from the vehicle's speed, the inflation pressures and the rotation frequencies, by using equation (7).

The invention also concerns a method for monitoring the inflation pressure of a first tire-wheel assembly of a vehicle moving at non-zero speed, the vehicle being equipped with a plurality of tire-wheel assemblies mounted on at least two axles and with devices that enable determination of the vehicle's speed, the rotation frequencies or speeds and the actual inflation pressures of at least two tire-wheel assemblies mounted on two different axles, the method comprising the following stages:

(A) determination of the inflation pressures and rotation frequencies of two tire-wheel assemblies mounted on two different axles;

(B) calculation of the load difference between the two tire-wheel assemblies from the vehicle's speed and the rotation frequencies of the two tire-wheel assemblies, taking into account the actual inflation pressures;

(C) determination of the load condition by comparing the calculated load difference with at least one predetermined threshold;

(D) determination of a lower threshold for the inflation pressure, appropriate for the load condition of the vehicle and the position of the said first tire-wheel assembly on the vehicle;

(E) determination of the inflation pressure of the said first tire-wheel assembly, and alerting of the driver of the vehicle if the inflation pressure of the first tire-wheel assembly is below the said lower threshold.

Stages (A) to (C) are the same as those described earlier for the load condition determination method; the same preferential choices apply.

Finally, the invention concerns a method for adapting the inflation pressure of a first tire-wheel assembly of a vehicle moving at non-zero speed, the vehicle being equipped with:

a plurality of tire-wheel assemblies mounted on at least two axles, devices for determining the vehicle's speed, the rotation frequencies or speeds and the actual inflation pressures of at least two tire-wheel assemblies mounted on different axles, and a device that enables the inflation pressure of the said first tire-wheel assembly to be changed, the method comprising the following stages:

(A) determination of the inflation pressures and rotation frequencies of two tire-wheel assemblies mounted on two different axles;

(B) calculation of the load difference between the two tire-wheel assemblies from the vehicle's speed and the rotation frequencies of the two tire-wheel assemblies, taking into account the actual inflation pressures;

(C) determination of the load condition by comparing the calculated load difference with at least one predetermined threshold;

(D) determination of a lower threshold for the inflation pressure, appropriate for the load condition of the vehicle and the position of the said first tire-wheel assembly on the vehicle;

(E) determination of the inflation pressure of the said first tire-wheel assembly, and increasing that inflation pressure if it is lower than the said lower threshold.

Again, stages (A) to (C) are the same as those described earlier for the load condition determination method, and the same preferential options apply.

The results obtained by the methods according to the invention can be improved if the vehicle also has devices that enable the determination of a temperature associated with each of the tires of the said at least two tire-wheel assemblies, such as the temperature of the gas with which the tire is inflated; the load difference calculation can then take this temperature into account. Expression (7) then becomes:

$$z_i(t) - z_0(t) = a \cdot E_{i,0}(t) + b \cdot (P_i(t) - P_0(t)) + c \cdot f_0(t) + d \cdot (T_i(t) - T_0(t)) + e \quad (10)$$

with $$a \equiv \frac{R_0(t)}{\frac{\partial R_{i,0}}{\partial z}} \quad b \equiv -\frac{\frac{\partial R_{i,0}}{\partial P}}{\frac{\partial R_{i,0}}{\partial z}} \quad c \equiv -\frac{\frac{\partial R_{i,0}}{\partial f}}{\frac{\partial R_{i,0}}{\partial z}} \quad (11)$$

$$d \equiv -\frac{\frac{\partial R_{i,0}}{\partial T}}{\frac{\partial R_{i,0}}{\partial z}} \quad e \equiv -\frac{\frac{\delta R_{i,0}}{\partial R_{i,0}}}{\frac{\partial R_{i,0}}{\partial z}}$$

It will then be necessary to determine five coefficients instead of four during the learning phase described earlier.

According to a preferred embodiment, the load condition is only determined when the vehicle's speed exceeds a certain predetermined limit, for example 15 km/h (a speed below which measurements furnished by an ABS system may be too imprecise) or 50 km/h (the test speed prescribed by the US Tread Act). This limit is chosen case by case, preferably at the same time as the coefficients in formula (7).

The methods according to the invention can be made more reliable if stages (A) and (B) are carried out for at least two different pairs of tire-wheel assemblies and if the load condition is determined on the basis of at least two calculated load differences.

BRIEF DESCRIPTION OF THE DRAWINGS invention will be better understood thanks to the description of the figures in which.

DETAILED DESCRIPTION OF THE INVENTION

Figure 1:
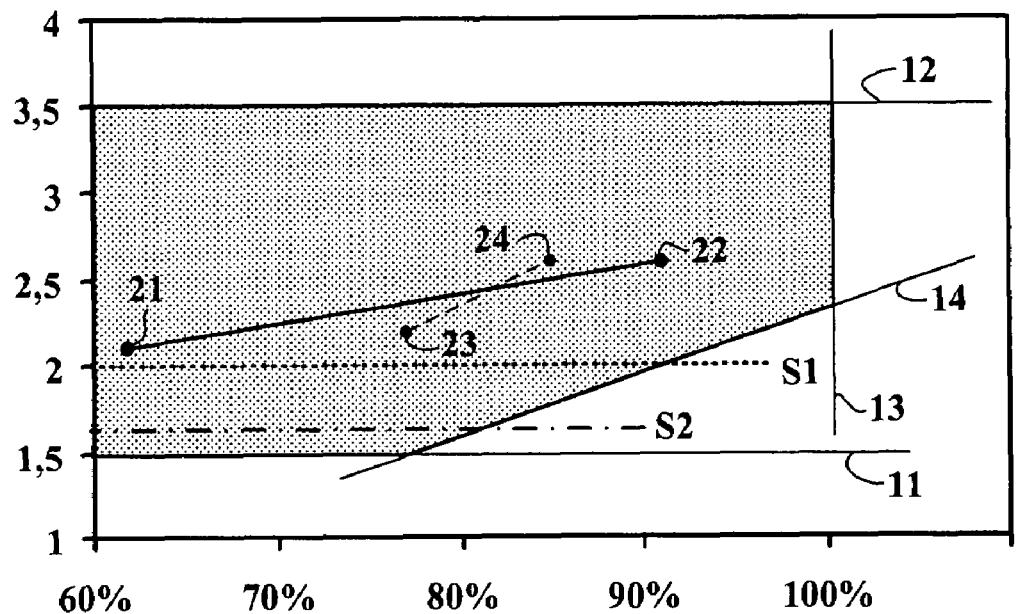
FIG. 1 shows an inflation diagram.

FIG. 1 shows an inflation diagram for a tire of size 205/55R16 91H. The abscissa corresponds to the percentage of the maximum load that the tire can carry; the ordinate represents its inflation pressure (in bar).

The shaded zone corresponds to the combinations of inflation pressures and loads to which the tire may be subjected in accordance with various applicable laws (such as the US Tread Act) and standards (such as the standards of the European Tire and Rim Organisation (ETRTO) or the Tire and Rim Association (TRA)). This zone is delimited in pressure by the minimum pressure prescribed by law (currently 1.5 bar in Europe for passenger cars), represented by the straight line 11, and by the maximum pressure permitted (in this case 3.5 bar), represented by the straight line 12. As regards the load, there is a load limitation due to the limits sustainable by the structure of the tire (line 13) but that is not the only limit to be respected, because when the tire is heavily loaded (in this case above 75% of its capacity) the legal minimum inflation pressure is not sufficient to allow proper operation. Additional standards, represented by the straight line 14, therefore reduce the authorized zone for heavy loads. In summary it can be said that if the pressure and load carried by the tire locate it within the shaded zone, it is operating in a condition authorized by the laws and standards applicable.

Of course, the inflation pressures recommended by the manufacturer of the vehicle on which the tire-wheel assembly is mounted are located within the said zone. FIG. 1 shows the four pressures recommended for a vehicle operating in traction, both for the tires on the rear axle (under low load, point 21, and high load, point 22) and for the tires of the front axle (under low load, point 23, and high load, point 24). The load carried by tires mounted at the rear varies much more markedly as a function of the overall load carried by the vehicle, whereas the addition of a load has only a small effect on the load carried by the front tires which are, in particular, supporting the weight of the vehicle's engine.

When the vehicle is under low load and the pressure of a tire is low, the shaded zone is only left when the minimum pressure of 1.5 bar is reached. A pressure monitoring system could therefore be programmed to trigger an alarm (or an inflation pressure increase) when the threshold represented by the line S2 is crossed. That threshold, however, is no longer acceptable when the vehicle is heavily loaded, because above a load percentage of 80% the threshold is outside the authorized (shaded) zone. Now if a higher threshold is adopted, sufficient to trigger an alarm in time when the vehicle is heavily loaded (line S1), there is a risk that the system will trigger false alarms when the vehicle is under low load because the recommended inflation pressure is very close to the threshold value. Since a simple ambient temperature variation of 20° can bring about an inflation pressure variation of the order of 0.2 bar, it is clear that the gap between the recommended inflation pressure and the threshold value for triggering an alarm must be at least of the order of 0.3 bar.

Several approaches have been proposed for overcoming that difficulty. The recommended pressure at low loads can be increased so as to distance it from the alarm threshold, but that approach degrades the comfort of the user of the vehicle, and this only to allow for a utilization mode (heavy load) which may be rare. Another solution would be to entrust the user of the vehicle with responsibility for indicating the load condition of the vehicle, for example by pressing a "high load" button when the vehicle is heavily loaded. That approach has the disadvantage of introducing the human factor in the pressure monitoring chain: if the user forgets or fails to press the button, he is open to some risk of using the tires under conditions that can degrade their performance without being alerted by the monitoring system. The method according to the invention enables the drawbacks related to both these strategies to be overcome.

Figure 2:
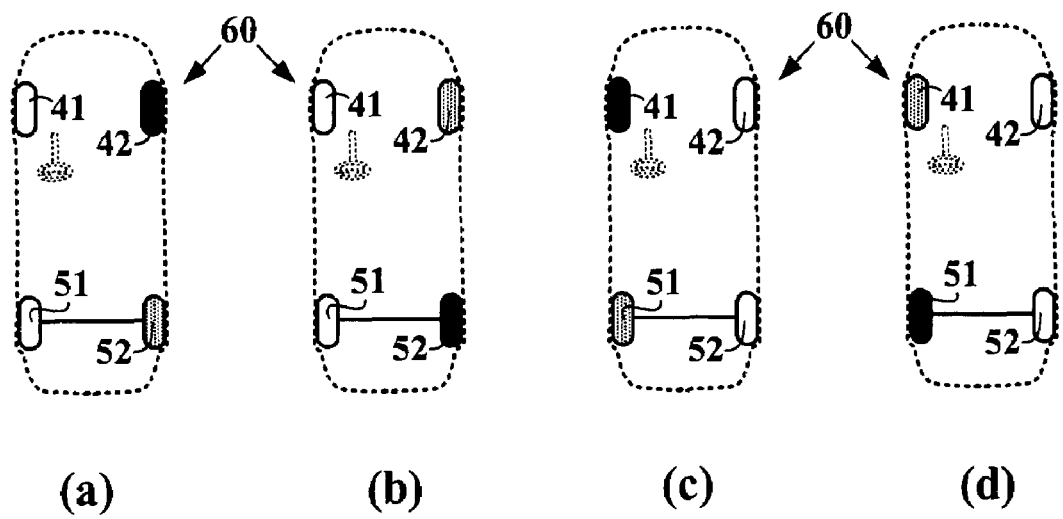
FIG. 2 illustrates the various preferred measurement configurations for determining the inflation pressures and rotation frequencies of two tire-wheel assemblies mounted on different axles.

As described earlier, the methods according to the invention enable the load condition to be detected from the inflation pressures and the rotation frequencies of two tire-wheel assemblies mounted on different axles. One of the two assemblies serves as a reference relative to which the relative flattening of the other assembly is determined. In a vehicle with two axles and four tire-wheel assemblies twelve configurations are possible, but it is preferable to consider two tire-wheel assemblies on the same side of the vehicle because that allows to overcome the undesirable effects due to bends and accelerations. FIG. 2 shows schematically the four preferred configurations. Any one of the four tire-wheel assemblies 41, 42, 51 and 52 mounted on the vehicle 60 can be used as the reference (indicated by an assembly filled in with black); the second assembly used in the methods according to the invention is shaded. It is found preferable to consider the two tire-wheel assemblies mounted on the driver's side (a side which is not always the same, depending on the country), i.e. to use the variants (c) and (d) of FIG. 4, because that position is less exposed to perturbations (stress at roundabouts etc.).

Figure 3:
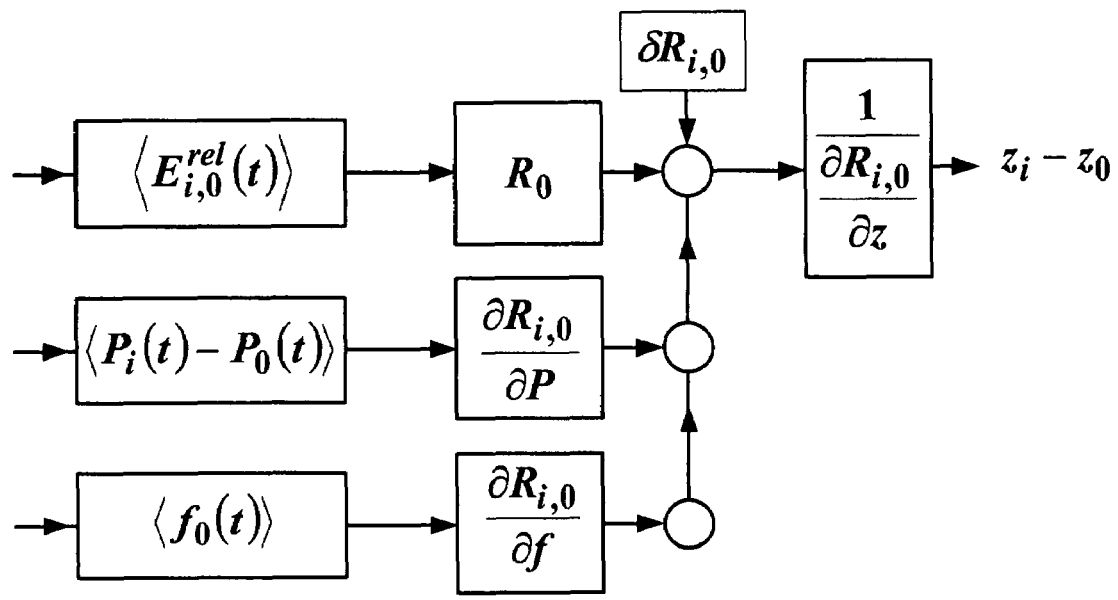
FIGS. 3 and 4 illustrate a calculation algorithm used in a method according to the invention.

FIG. 3 illustrates schematically an algorithm which implements the method according to the invention. When the vehicle begins moving, the speed v of the vehicle 60 and the rotation frequencies and inflation pressures of all the tire-wheel assemblies 41, 42, 51 and 52 (or at least of the two required in the method of the invention, for example assemblies 42 and 52 in the configuration of FIG. 2(*a*)) are determined and stored. To reduce noise, a sliding mean is computed for the relative flattening $E_{i,0}^{rel}(t)$, 1*a*, the pressure difference $P_i(t)-P_o(t)$ and the rotation frequency $f_o$ of the reference wheel, to obtain the values $<E_{i,0}^{rel}(t)>$, $<P_i(t)-P_0(t)>$, and $<f_0>$. The algorithm enables the value of the load difference $z_i(t)-z_o(t)$ to be calculated from those data using equation (7) and the coefficients determined during a prior learning phase, as described earlier.

Figure 4:
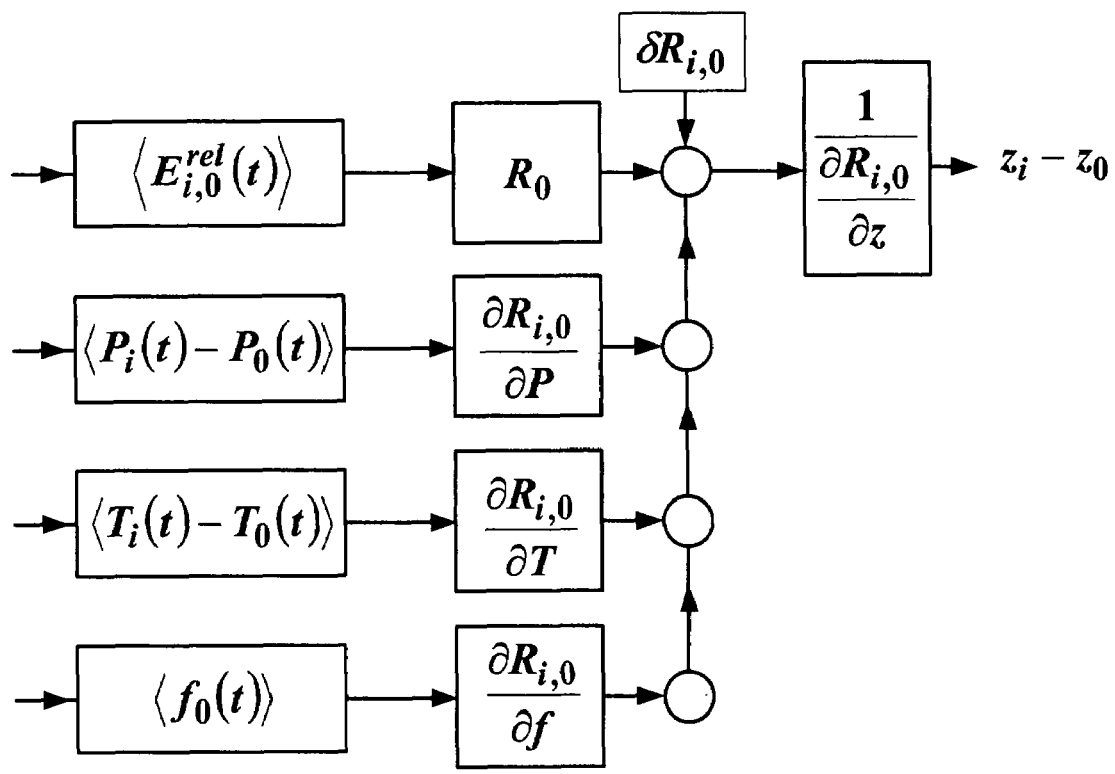

FIG. 4 represents schematically an algorithm that implements the method according to the invention, which also takes into account the temperature of the tire (or more precisely, the temperature of the gas inflating the tire). The way in which the algorithm works is basically no different.

A numerical example allows the implementation of the method according to the invention to be illustrated. For the sake of simplicity only a traction case is considered, but this is not a limiting characteristic of the invention. Table 1 summarizes the load $z_i(t)-z_o(t)$ measured with the aid of a balance for a passenger car (small monospace) in the configurations corresponding to FIGS. 2(*d*) and 2(*b*).

TABLE 1

| $z_i(t) - z_0(t)$ [kg] | Configuration 2(d) left side | Configuration 2(b) right side |
|---|---|---|
| Unloaded | 133 | 140.5 |
| Intermediate load | 103.5 | 96 |
| Maximum load | 61 | 50 |

Table 1 suggests that a precision of the order of 20 kg is needed if the load condition is to be determined relatively approximately, for example to distinguish between a "heavy load" and an "unloaded" condition. To obtain that distinction a threshold must be defined, beyond which the "heavy load" condition has been reached. That threshold could for example be set at 100 kg: when a load difference $z_i(t)-z_o(t)$ equal to or smaller than 100 kg is detected, the device implementing the method according to the invention-changes to the "heavy load" mode, which can be used to define a suitable inflation pressure, or even, if the vehicle is equipped with inflation means, to trigger a compensating inflation of certain tires.

The precision with which the load difference is determined depends, inter alia, on the time $T_f$ over which the data measured on the vehicle are averaged. The optimum value of $T_f$ must be determined case by case, preferably at the same time as the coefficients occurring in formula 7. In general the time will be between 5 and 20 minutes, which makes it possible to satisfy both the need for precision and the legal obligations (the US Tread Act stipulates that a pressure anomaly must be detected within a time not exceeding 20 minutes).

Figure 5:
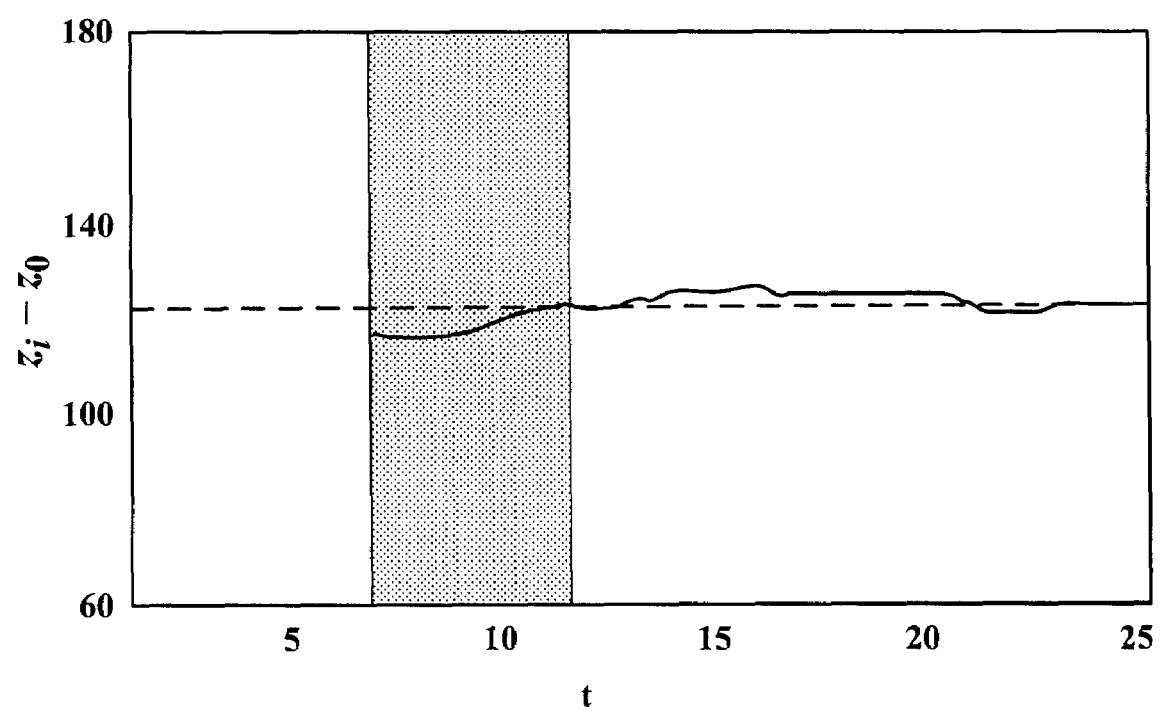
FIG. 5 illustrates the results obtained with the method according to the invention.

FIG. 5 shows a result obtained on a passenger car (small monospace); the load difference $z_i(t)-z_o(t)$ as calculated by the algorithm of FIG. 4 is plotted as a function of time (in minutes). The shaded zone corresponds to the period between the moment when the measurements began (at about 7 minutes) and the moment when the first value to be taken into account by the pressure monitoring system is obtained (the duration of the said period being $T_f$). During this period the calculated value of $z_i(t)-z_o(t)$ converges towards the true value (indicated by a broken line): after five minutes a value very close to the true value is obtained. Thereafter the calculation drifts slightly away from the true value, but the deviations remain less than 10 kg.

What is claimed is:

1. A method for determining the load condition of a vehicle (60) moving at non-zero speed, the vehicle being equipped with a plurality of tire-wheel assemblies (41-42, 51-52) mounted on at least two axles and with devices enabling determination of the vehicle's speed, the rotation frequencies or speeds and the actual inflation pressures of at least two tire-wheel assemblies mounted on two different axles, the method comprising the following stages:
    (A) determination of the inflation pressures and rotation frequencies of two tire-wheel assemblies mounted on two different axles;
    (B) calculation of the load difference between the two tire-wheel assemblies from the vehicle's speed and the rotation frequencies of the two tire-wheel assemblies, taking into account the actual inflation pressures;

(C) determination of the load condition by comparing the calculated load difference with at least one predetermined threshold.

2. The method of claim 1, wherein the vehicle (60) also comprises devices that enable determination of a temperature associated with each of the tires of the said at least two tire-wheel assemblies, and wherein the load difference calculation takes that temperature into account.

3. The method of claim 2, wherein the temperature associated with the tires is the temperature of the tire inflation gas.

4. The method of claim 1, wherein the said two tire-wheel assemblies mounted on two different axles are mounted on the same side of the vehicle.

5. The method of claim 4, wherein the said two tire-wheel assemblies mounted on two different axles are mounted on the driver's side of the vehicle.

6. The method of claim 1, wherein the load condition is only determined when the vehicle's speed exceeds a certain predetermined limit.

7. The method of claim 1, wherein the stages (A) and (B) are also carried out for at least one other, different pair of tire-wheel assemblies, and the load condition is determined on the basis of at least two calculated load differences.

8. A method for monitoring the inflation pressure of a first tire-wheel assembly of a vehicle (60) moving at non-zero speed, the vehicle being equipped with a plurality of tire-wheel assemblies (41-42, 51-52) mounted on at least two axles and with devices enabling determination of the vehicle's speed, the rotation frequencies or speeds and the actual inflation pressures of at least two tire-wheel assemblies mounted on two different axles, the method comprising the following stages:

(A) determination of the inflation pressures and rotation frequencies of two tire-wheel assemblies mounted on two different axles;

(B) calculation of the load difference between the two tire-wheel assemblies from the vehicle's speed and the rotation frequencies of the two tire-wheel assemblies, taking into account the actual inflation pressures;

(C) determination of the load condition by comparing the calculated load difference with at least one predetermined threshold;

(D) determination of a lower threshold for the inflation pressure, appropriate for the load condition of the vehicle and for the position of the said first tire-wheel assembly on the vehicle;

(E) determination of the inflation pressure of the said first tire-wheel assembly and alerting of the driver of the vehicle if the inflation pressure of the first tire-wheel assembly is below the said lower threshold.

9. The method of claim 8, wherein the vehicle (60) also comprises devices that enable determination of a temperature associated with each of the tires of the said at least two tire-wheel assemblies, and wherein the load difference calculation takes that temperature into account.

10. The method of claim 9, wherein the temperature associated with the tires is the temperature of the tire inflation gas.

11. The method of claim 8, wherein the said two tire-wheel assemblies mounted on two different axles are mounted on the same side of the vehicle.

12. The method of claim 11, wherein the said two tire-wheel assemblies mounted on two different axles are mounted on the driver's side of the vehicle.

13. The method of claim 8, wherein the load condition is only determined when the vehicle's speed exceeds a certain predetermined limit.

14. The method of claim 8, wherein the stages (A) and (B) are also carried out for at least one other, different pair of tire-wheel assemblies, and the load condition is determined on the basis of at least two calculated load differences.

15. A method for adapting the inflation pressure of a first tire-wheel assembly (41-42, 51-52) of a vehicle (60) moving at non-zero speed, the vehicle being equipped with:

a plurality of tire-wheel assemblies mounted on at least two axles, devices enabling determination of the vehicle's speed, the rotation frequencies or speeds and the actual inflation pressures of at least two tire-wheel assemblies mounted on two different axles, and a device which enables the inflation pressure of the said first tire-wheel assembly to be modified, the method comprising the following stages:

(A) determination of the inflation pressures and rotation frequencies of two tire-wheel assemblies mounted on two different axles;

(B) calculation of the load difference between the two tire-wheel assemblies from the vehicle's speed and the rotation frequencies of the two tire-wheel assemblies, taking into account the actual inflation pressures;

(C) determination of the load condition by comparing the calculated load difference with at least one predetermined threshold;

(D) determination of a lower threshold for the inflation pressure, appropriate for the load condition of the vehicle and for the position of the said first tire-wheel assembly on the vehicle;

(E) determination of the inflation pressure of the said first tire-wheel assembly and increase of that inflation pressure if it is below the said lower threshold.

16. The method of claim 15, wherein the vehicle (60) also comprises devices that enable determination of a temperature associated with each of the tires of the said at least two tire-wheel assemblies, and wherein the load difference calculation takes that temperature into account.

17. The method of claim 16, wherein the temperature associated with the tires is the temperature of the tire inflation gas.

18. The method of claim 15, wherein the said two tire-wheel assemblies mounted on two different axles are mounted on the same side of the vehicle.

19. The method of claim 18, wherein the said two tire-wheel assemblies mounted on two different axles are mounted on the driver's side of the vehicle.

20. The method of claim 15, wherein the load condition is only determined when the vehicle's speed exceeds a certain predetermined limit.

21. The method of claim 15, wherein the stages (A) and (B) are also carried out for at least one other, different pair of tire-wheel assemblies, and the load condition is determined on the basis of at least two calculated load differences.

* * * * *